3,652,658
ESTER DERIVATIVES OF BIS[p-(AMINO-LOWER ALKYLENEOXY)PHENYL]ALKANOLS

Josef Fried, 5715 S. Kenwood Ave., Chicago, Ill. 60637; Edward Joseph Pribyl, 80 Mason Drive, Metuchen, N.J. 08840; and John Krapcho, 150 DeMott Lane, Somerset, N.J. 08873
No Drawing. Continuation-in-part of application Ser. No. 566,245, July 19, 1966, which is a continuation-in-part of application Ser. No. 288,630, June 18, 1963. This application Jan. 23, 1969, Ser. No. 793,608
Int. Cl. C07c 93/14
U.S. Cl. 260—490                    5 Claims

ABSTRACT OF THE DISCLOSURE

This application relates to acids and esters of the general formula

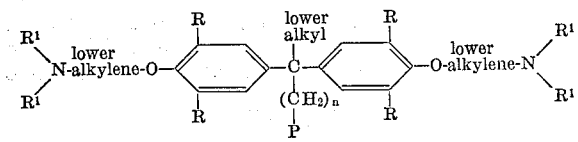

and to acid addition salts thereof. These substances inhibit cholesterol biosynthesis and aid in the regulation of cholesterol in the blood.

---

This application is a continuation-in-part of application Ser. No. 566,245, filed July 19, 1966, now abandoned, which is in turn a continuation-in-part of application Ser. No. 288,630, filed June 18, 1963, now abandoned.

SUMMARY OF THE INVENTION

This invention relates to new compounds of the formula (I)

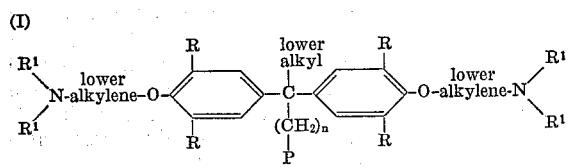

and to acid addition salts thereof.

The symbols in Formula I have the following meanings:

P represents the radicals $COOR^2$ or $CH_2OR^3$
(a)          (b)

R represents hydrogen, hydroxy, lower alkyl, lower alkoxy or halo.
$R^1$ represents hydrogen, an aliphatic or araliphatic group or forms a heterocyclic group with the nitrogen.
$R^2$ represents hydrogen or lower alkyl.
$R^3$ represents the acyl group of an aliphatic or araliphatic carboxylic acid.
$n$ is 1 to 6.

The lower alkyl groups represented by the symbols referred to above include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to an oxygen atom. Similarly, the lower alkylene groups are divalent radicals of the same kind.

The acyl groups represented by $R^3$ are the radicals of the saturated and monounsaturated aliphatic acids having up to about 18 carbon atoms, including for example, acetyl, propionyl, butyryl, heptanoyl, decanoyl, dodecanoyl, stearyl, oleyl, and the like. Phenyl-lower alkanoic acids such as benzoic, phenylacetic acids and the like are illustrative of the acids from which aralkanoyl groups are derived. Lower alkanoyl is preferred.

Each of the four halogens is contemplated by the term "halo," but chlorine and bromine are preferred.

In the basic nitrogen containing radicals represented by each group

each $R^1$ represents hydrogen, lower alkyl, hydroxy-lower alkyl, phenyl-lower alkyl and N-(lower alkyl)phenyl (lower alkyl), forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxy-ethylamino, di(hydroxy-lower alkyl)amino, e.g., di(hydroxyethyl)amino, phenyl(lower alkyl)amino, e.g., benzylamino, phenethylamino, N-(lower alkyl)phenyl(lower alkyl)amino, e.g., N-methylbenzylamino, and the like.

In addition, the nitrogen may join with groups represented by $R^1$ to form a 5 to 7 membered monocyclic heterocyclic containing, if desired, an oxygen, sulfur or an additional nitrogen atom (not more than two hetero atoms altogether), that is, the two symbols $R^1$ represent together $(R^4)_p$-tetramethylene, $(R^4)_p$-pentamethylene, $(R^4)_p$-hexamethylene, $(R^4)_p$-oxatetramethylene, $(R^4)_p$-oxapentamethylene, $(R^4)_p$-azahexamethylene, $(R^4)_p$-azatetramethylene, $(R^4)_p$-azapentamethylene, $(R^4)_p$-thiapentamethylene or $(R^4)_p$-thiatetramethylene. $R^4$ is hydrogen, hydroxy, nitro, lower alkyl, lower alkoxy, lower alkanoyl, halo, di-lower alkylamino-lower alkylene, hydroxy-lower alkyl or lower alkanoyloxy-lower alkyl, and $p$ is 1 or 2.

Thus heterocyclic groups represented by the radical

include, for example, piperidino, (lower alkyl)piperidino, e.g., dimethylpiperidino, (lower alkoxy)piperidino, e.g., methoxypiperidino, pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, morpholino, (lower alkyl)morpholino, e.g., 2-methylmorpholino, di(lower alkyl) morpholino, e.g., 2,3-dimethylmorpholino, (lower alkoxy)morpholino, e.g., ethoxymorpholino, thiamorpholino, (lower alkyl) thiamorpholino, e.g., 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., $N^4$-methylpiperazino, 2-methylpiperazino or $N_4$-ethylpiperazino, di(lower alkyl)piperazino, e.g., 2,3-dimethylpiperazino, hydroxy-lower alkylpiperazino or $N^4$-ethylpiperazino, di(lower alkyl)piperimino and homopiperazino.

DETAILED DESCRIPTION OF THE INVENTION

The new compounds of this invention may be produced from esters of the formula ($R^2$=lower alkyl)

(II)

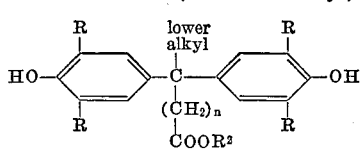

These esters (II) are prepared by condensing the appropriate phenol with a keto ester as described in J. Org. Chem. 23, 1004 (1958).

The basic group is introduced by reacting the ester of Formula II with about two proportions of a halide of the formula (III) 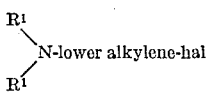

Preferably a chloride or bromide is the halogen represented by hal, although it is not necessary to be limited to those two.

The resulting ester has the formula (IV) 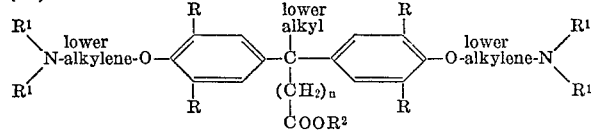

Hydrolysis of the compound of Formula IV yields the corresponding acid ($R^2$=H).

Treatment of the ester or acid of Formula IV with a reducing agent such as lithium aluminum hydride yields an alcohol of Formula I wherein P is $CH_2OH$. Esterification with an acid halide or anhydride by conventional procedures gives the ester of Formula I wherein P is $CH_2OR^3$.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The new compounds of this invention are therapeutically active substances which are useful as hypocholesteremic agents. They inhibit cholesterol biosynthesis and regulate the cholesterol in the blood of warm-blooded animals such as rats or the like. Thus they are useful in the treatment of conditions such as atherosclerosis. These products may be administered orally or parenterally, e.g., at a dosage level of 2 to 40 mg./kg./day in single or divided doses, preferably 1 to 10 mg./kg. orally two to four times daily, in the form of tablets, capsules, elixirs, injectables, or the like by incorporating the base of Formula I or a physiologically acceptable acid addition salt thereof in a conventional vehicle prepared with suitable vehicle, excipient, lubricant, flavor, etc., according to accepted pharmaceutical practice.

The following examples are illustrative of the invention. All temperatures are expressed on the centigrade scale.

EXAMPLE 1

4,4-bis[p-(2-diethylaminoethoxy)phenyl]valeric acid, ethyl ester

A solution of 99.0 g. (0.32 mole) of 4,4-bis(p-hydroxyphenyl)valeric acid, ethyl ester in 200 ml. of dimethylformamide is treated portionwise with 30 g. (0.63 mole) sodium hydride (50 percent dispersion). The reaction is exothermic and the temperature of the mixture is maintained below 60° by cooling. After completion of the addition of the hydride, the slurry is heated to 80°, cooled to 40° and treated with 290 ml. of 2.2 N 2-diethylaminoethyl chloride (0.63 mole) in toluene. This mixture is gradually heated and then maintained at 100–110° for three hours. The major portion of the solvent is removed under reduced pressure; the residue is treated with 200 ml. of water and then extracted twice with 600 ml. portions of ether. The ether phases are combined and shaken with (1) 100 ml. of 5 percent sodium bicarbonate solution and (2) 50 ml. of water. The ether phase is dried over magnesium sulfate, charcoal is added and the mixture filtered. The filtrate is concentrated under reduced pressure to give 146 g. of syrupy material. A solution of 125.7 g. of the above material in 600 ml. of ether is added to a cold solution of 50 ml. of concentrated hydrochloric acid in 300 ml. of water. The mixture is shaken, the organic phase is discarded and the aqueous phase is washed with 300 ml. of ether. The aqueous phase is treated with a cold solution of 30 g. of sodium hydroxide in 100 ml. of water. The organic phase is extracted with 400 ml. portions of ether (three times). The ether phases are combined, dried over magnesium sulfate, filtered and the filtrate concentrated under reduced pressure to give 91.3 g. (66 percent) of pale orange syrupy product.

EXAMPLE 2

4,4-bis[p-(2-diethylaminoethoxy)phenyl]valeric acid

The ester produced in Example 1 is refluxed in an equivalent quantity of potassium hydroxide in ethanol, the solvent is stripped off and the residue is dissolved in water and neutralized with acetic acid to give the free acid.

EXAMPLE 3

4,4-bis[p-(2-dimethylaminoethoxy)phenyl]valeric acid methyl ester

Sixty grams (0.2 mole) of 4,4-bis(p-hydroxyphenyl)valeric acid, methyl ester, 20 g. (0.42 mole) of 50 percent sodium hydride and 250 ml. of 1.7 N 2-dimethylaminoethyl chloride (0.42 mole) in toluene are reacted in 175 ml. of dimethylformamide as described in Example 1. The bulk of solvents is removed in vacuo on a rotary evaporator at 70° and the cooled residue is shaken with 150 ml. of water and 400 ml. of ether. The layers are separated and the aqueous phase extracted twice more with 200 ml. portions of ether. The combined ether layers are washed with 100 ml. of water and added to a cold solution of 38 ml. of concentrated hydrochloric acid in 400 ml. of water. After shaking, the layers are separated and the aqueous phase is washed with ether, cooled and treated with a cold solution of 20 g. of sodium hydroxide in 100 ml. of water. The liberated base of the ether gives 48.5 g. (55 percent) of syrupy material.

EXAMPLE 4

4,4-bis[p-(2-diethylaminoethoxy)phenyl]pentanol

The ester of Example 1 (25 g.) is dissolved in ether and added dropwise to an ethereal solution of 1.5 g. of lithium aluminum hydride. The mixture is refluxed for two hours, cooled and treated with a small quantity of sodium hydroxide solution. The ethereal solution of the product 4,4-bis[p - (2 - diethylaminoethoxy)phenyl]pentanol, is decanted from the inorganic salts, dried over magnesium sulfate, filtered and the solvent evaporated to give 17.7 g. of the product.

EXAMPLE 5

4,4-bis[p-(2-diethylaminoethoxy)phenyl]pentanol, ester with decanoic acid, hydrochloride A benzene solution of the alcohol of Example 4 is added to a benzene solution of the acid chloride of decanoic acid at room temperature. After two hours, the solvent is removed to give the product.

EXAMPLE 6

4,4-bis[p-(2-pyrrolidinoethoxy)phenyl]valeric acid, methyl ester

Seventy-eight grams (0.26 mole) of 4,4-bis(p-hydroxyphenyl)valeric acid, methyl ester, 26 g. (0.54 mole) of 50 percent sodium hydride and 73 g. (0.54 mole) of N-2-chloroethyl)pyrrolidine (released from the hydrochloride; B.P. 67°/12 mm.) are reacted in 250 ml. of dimethylformamide as described in Example 3 to give 89.5 g. of this product.

EXAMPLE 7

4,4-bis[p-(2-morpholinoethoxy)phenyl]valeric acid, methyl ester

Interaction of 78 g. of 4,4-bis(p-hydroxyphenyl)valeric acid, methyl ester with 26 g. of 50 percent NaH and 82 g. of 2-chloroethylmorpholine in dimethylformamide as described in Example 1 gives 86.0 g. of this product.

EXAMPLE 8

4,4-bis[p-[2-(2,6-dimethylmorpholino)ethoxy]phenyl] valeric acid, ethyl ester

Following the procedure of Example 1, but substituting an equivalent quantity of 2-(2,6-dimethylmorpholino) ethyl chloride for the 2-diethylaminoethyl chloride, the product is obtained.

EXAMPLE 9

4,4-bis[p-[3-(4-methylpiperazino)propoxy]phenyl] valeric acid, ethyl ester

Following the procedure of Example 1, but substituting an equivalent amount of 3-(4-methylpiperazino)propyl bromide for the 2-diethylaminoethyl chloride, the product is obtained.

EXAMPLE 10

3,3-bis[p-(2-diethylaminoethoxy)phenyl]butyric acid, ethyl ester

Following the procedure of Example 1 but substituting an equivalent quantity of 3,3-bis(p-hydroxyphenyl)butyric acid, ethyl ester for the 4,4-bis(p-hydroxyphenyl) valeric acid, ethyl ester, the product is obtained.

EXAMPLE 11

5,5-bis[p-(2-diethylaminoethoxy)phenyl]hexanoic acid, propyl ester

Following the procedure of Example 1 but substituting an equivalent quantity of 5,5-bis(p-hydroxyphenyl) hexanoic acid, propyl ester for the 4,4-bis(p-hydroxyphenyl)valeric acid, ethyl ester, the product is obtained.

EXAMPLES 12–15

Using the procedure of Example 1 but replacing the 4,4-bis(p-hydroxyphenyl)valeric acid, ethyl ester by the corresponding esters of:

(A) 4,4-bis(3-methyl-4-hydroxyphenyl)valeric acid,
(B) 4,4-bis(3-ethoxy-4-hydroxyphenyl)valeric acid,
(C) 4,4-bis(3-chloro-4-hydroxyphenyl)valeric acid,
(D) 4,4-bis(3,5-dimethyl)-4-hydroxyphenyl valeric acid, respectively, there is obtained, respectively:

Example 12, 4,4 - bis[4 - (2 - diethylaminoethoxy)-3-methylphenyl]valeric acid, ethyl ester.
Example 13, 4,4-bis[4 - (2 - diethylaminoethoxy) - 3-ethoxyphenyl]valeric acid, ethyl ester.
Example 14, 4,4 - bis[4-(2-diethylaminoethoxy)-3-chlorophenyl]valeric acid, ethyl ester.
Example 15, 4,4 - bis[4 - (2 - diethylaminoethoxy) - 3,5-dimethylphenyl]valeric acid, ethyl ester.

EXAMPLES 16–26

Utilizing the hydrolysis procedure described in Example 2, but replacing the 4,4-bis[p-(2-diethylaminoethoxy) phenyl]valeric acid, ethyl ester by the materials obtained in Examples 3 and 6 to 15, the following products are obtained:

Example 16, 4,4 - bis[p - (2 - dimethylaminoethoxy) phenyl]valeric acid.
Example 17, 4,4-bis[p-(2-pyrrolidinoethoxy)phenyl] valeric acid.
Example 18, 4,4 - bis[p - (2 - morpholinoethoxy) phenyl]valeric acid.
Example 19, 4,4-bis[p-[2-(2,6-dimethylmorpholino) ethoxy]phenyl]valeric acid.
Example 20, 4,4 - bis[p - [3 - (4 - methylpiperazino) propoxy]phenyl]valeric acid.
Example 21, 3,3-bis[p-(2-diethylaminoethoxy)phenyl] butyric acid.
Example 22, 5,5-bis[p-(2-diethylaminoethoxy)phenyl] hexanoic acid.
Example 23, 4,4 - bis[4 - (2 - diethylaminoethoxy)-3-methylphenyl]valeric acid.
Example 24, 4,4 - bis[4 - (2 - diethylaminoethoxy)-3-ethoxyphenyl]valeric acid.
Example 25, 4,4 - bis[4 - (2 - diethylaminoethoxy)-3-chlorophenyl]valeric acid.
Example 26, 4,4-bis[4 - (2 - diethylaminoethoxy)-3,5-dimethylphenyl]valeric acid.

EXAMPLES 27–37

Utilizing the same procedure described in Example 4 but replacing the 4,4-bis[p-(2-diethylaminoethoxy)phenyl] valeric acid ethyl ester by the products described in Examples 3 and 6 to 15, there is obtained:

Example 27, 4,4 - bis[p - (2 - dimethylaminoethoxy) phenyl]pentanol.
Example 28, 4,4 - bis[p - (2 - pyrrolidinoethoxy) phenyl]pentanol.
Example 29, 4,4 - bis[p - (2 - morpholinoethoxy) phenyl]pentanol.
Example 30, 4,4 - bis[p - [2-(2,6-dimethylmorpholino) ethoxy]phenyl]pentanol.
Example 31, 4,4 - bis[p - [3 - (4 - methylpiperazino) propoxy]phenyl]pentanol.
Example 32, 3,3 - bis[p - (2 - diethylaminoethoxy) phenyl]butanol.
Example 33, 5,5 - bis[p - (2 - diethylaminoethoxy) phenyl]hexanol.
Example 34, 4,4 - bis[4 - (2 - diethylaminoethoxy)-3-methylphenyl]pentanol.
Example 35, 4,4 - bis[4 - (2 - diethylaminoethoxy)-3-ethoxyphenyl]pentanol.
Example 36, 4,4 - bis[4 - (2 - diethylaminoethoxy)-3-chloro)phenyl]pentanol.
Example 37, 4,4 - bis[4 - (2 - diethylaminoethoxy)-3,5-dimethylphenyl]pentanol.

EXAMPLE 38

4,4-bis[p-(2-dimethylaminoethoxy)phenyl]pentanol, ester with acetic acid, hydrochloride Utilizing the procedure described in Example 5 but substituting an equivalent quantity of acetyl chloride for the acid chloride of decanoic acid, the above product is obtained. In a similar manner, the acetic acid esters of the alcohols of Examples 27 to 37 are obtained.

This invention may be variously otherwise embodied within the scope of the appended claims.

What is claimed is:

1. A compound of the formula

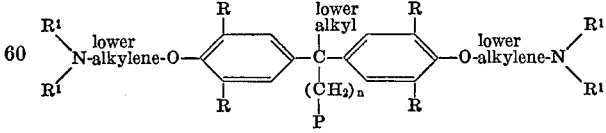

wherein P represents the radical

$CH_2OR^3$

R is hydrogen, hydroxy, lower alkyl, lower alkoxy, or halo; $R^1$ is hydrogen, lower alkyl, hydroxy-lower alkyl, phenyl-lower alkyl, (lower alkyl)phenyl(lower alkyl; $R^3$ is alkanoyl or alkenoyl of up to about 18 carbon atoms or phenyl-lower alkanoyl and $n$ is an integer from 1 to 6 and acid addition salts thereof.

2. A compound according to claim 1 wherein each R is hydrogen, each $R^1$ is lower alkyl and P is $CH_2O$-lower alkanoyl.

3. A compound according to claim 1 wherein R and R¹ are all hydrogen, $n$ is 2 and P is CH₂OOC-ethyl.

4. A compound according to claim 1 wherein R and R¹ are all hydrogen, $n$ is 2 and P is CH₂OOC-methyl.

5. A compound according to claim 4 wherein each lower alkylene group has two carbons and the lower alkyl group has one carbon.

References Cited

UNITED STATES PATENTS

| | | | |
|---|---|---|---|
| 3,243,461 | 3/1966 | Palopoli et al. | 260—570 |
| 3,250,767 | 5/1966 | Bencze | 260—570 |

JAMES A. PATTEN, Primary Examiner

V. GARNER, Assistant Examiner

U.S. Cl. X.R.

260—239 B, 239 BF, 239 BC, 239 R, 243 B, 247.2 B, 247.2 R, 247.7 A, 256, 268 R, 294 D, 294.3 A, 294.3 E, 294.7 M, 326.3 326.5 N, 343.7, 404.5, 471 A, 473 S, 476 R, 486 H, 486 R, 501.18, 519; 570 R; 424—199, 246, 248, 250, 267, 274, 289, 309, 311, 312, 314, 316, 319

UNITED STATES PATENT OFFICE
CERTIFICATE OF CORRECTION

Patent No. 3,652,658                    Dated March 28, 1972

Inventor(s) Josef Fried, Edward Joseph Pribyl, John Krapcho

It is certified that error appears in the above-identified patent and that said Letters Patent are hereby corrected as shown below:

Column 2, second formula

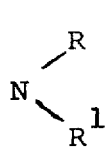     should read     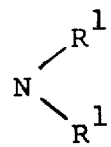

Column 2, line 55, "$N_4$" should read --$N^4$--. Column 2, lines 57 and 58, "piperazino or $N^4$-ethylpiperazino, di-(lower alkyl)piperimino and homopiperazino" should read --piperazino, e.g. hydroxyethylpiperazino, hexamethylene-imino and homopiperazino--. Column 6, line 22, "3 and 6" should read --3, and 6--. Column 6, line 69, "alkyl,(lower alkyl)phenyl(lower alkyl;" should read --alkyl, (lower alkyl)phenyl(lower alkyl);--.

Signed and sealed this 24th day of October 1972.

(SEAL)
Attest:

EDWARD M. FLETCHER, JR.                ROBERT GOTTSCHALK
Attesting Officer                      Commissioner of Patents